United States Patent [19]
Meyer

[11] Patent Number: 4,874,078
[45] Date of Patent: Oct. 17, 1989

[54] PACKAGE HANDLING AND RE-ORIENTING APPARATUS, PARTICULARLY COMPRESSIVE PAPER ROLLS, SUCH AS TOILET PAPER, KITCHEN TOWELS, AND THE LIKE

[75] Inventor: Dieter Meyer, Ludwigshafen, Fed. Rep. of Germany

[73] Assignee: Paper Converting Machine GmbH, Schifferstadt, Fed. Rep. of Germany

[21] Appl. No.: 201,575

[22] Filed: Jun. 1, 1988

[30] Foreign Application Priority Data

Jun. 12, 1987 [DE] Fed. Rep. of Germany ....... 3719574

[51] Int. Cl.$^4$ ............................................. B65G 47/24
[52] U.S. Cl. .................................. 198/409; 198/468.6; 414/798.5
[58] Field of Search ............ 198/406, 409, 413, 468.6; 414/106, 107, 38, 798.6, 798.5, 789.2, 798.2

[56] References Cited

U.S. PATENT DOCUMENTS 4,502,588 3/1985 Whiteside et al. .................. 198/409

FOREIGN PATENT DOCUMENTS 1056956 5/1959 Fed. Rep. of Germany.
7931246 2/1980 Fed. Rep. of Germany.
3600817 7/1987 Fed. Rep. of Germany.
0727438 4/1980 U.S.S.R. .............................. 414/107

1207934 1/1986 U.S.S.R. ............................... 198/409

Primary Examiner—Robert J. Spar
Assistant Examiner—D. Glenn Dayoan
Attorney, Agent, or Firm—Frishauf, Holtz, Goodman & Woodward

[57] ABSTRACT

To transport and turn compressible paper products, such as toilet paper rolls, kitchen towels and the like, a plurality of such products are received, lying flat, on an L-shaped receiver (4) which pivots to stand them on end and moves in translatory direction towards a removal transport apparatus, the translatory movement being guided by guide rods (8) and the pivoting or tilting movement of the receiver being controlled by an engagement element, such as a pin or pins (14) engaging a guide track or tracks (13) so that the receiver will pivot as it is moved in translatory direction. Preferably, the receiver surfaces (4a, 4b) are formed in comb, fork or tine structure, to interdigit with support structures from which the goods are received and to which they are delivered. The guide track itself is movable, for example by a cylinder-piston system (15) synchronized with translatory movement of the receiver to provide for gentle acceleration and deceleration of the receiver when it is carrying products, and abrupt return movement and re-tilting to a receiving position for pick-up of a subsequent group of products.

12 Claims, 3 Drawing Sheets

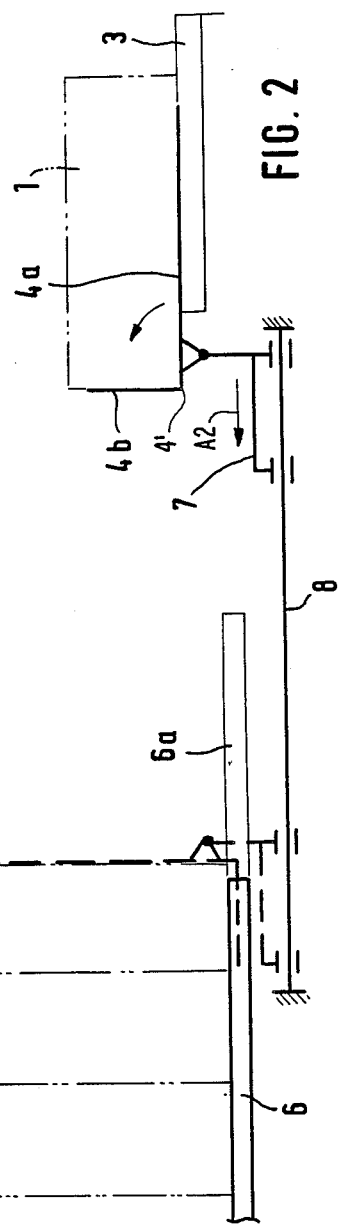
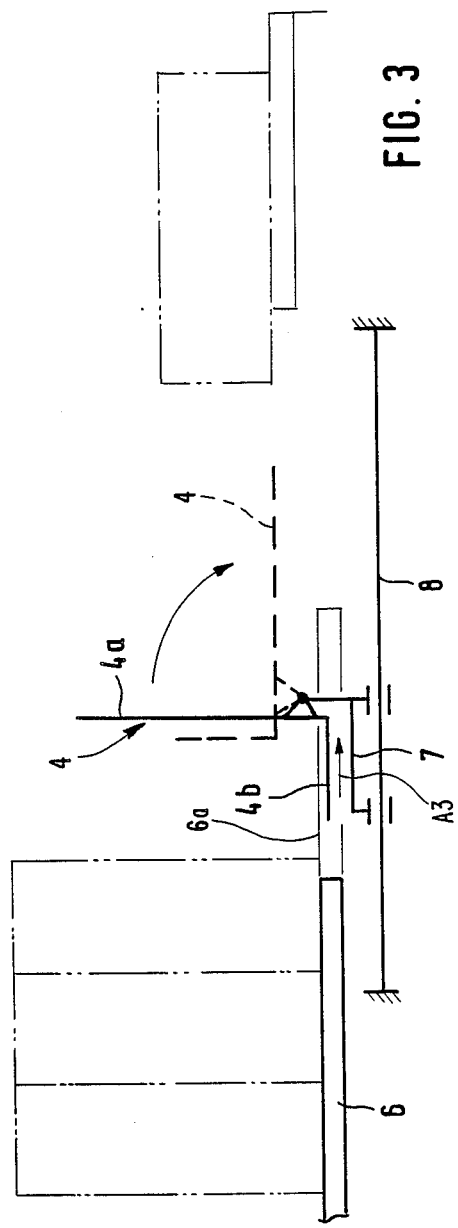

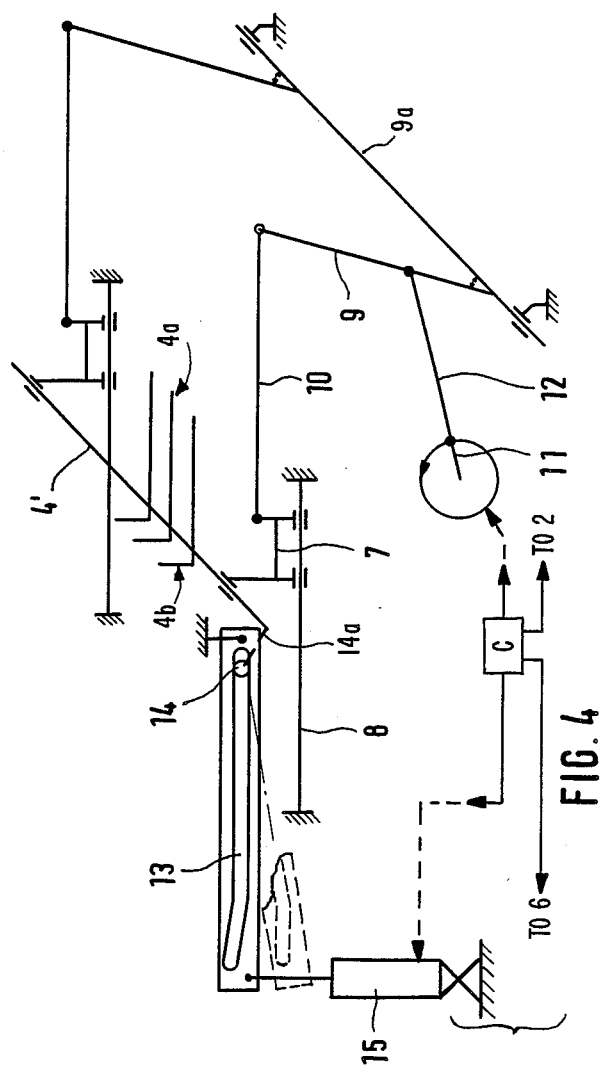

PACKAGE HANDLING AND RE-ORIENTING APPARATUS, PARTICULARLY COMPRESSIVE PAPER ROLLS, SUCH AS TOILET PAPER, KITCHEN TOWELS, AND THE LIKE

Reference to related disclosures: German Utility Model DE-GM 79 31 246, German Patent Disclosure Document DE-OS 36 00 817.

The present invention relates to package handling apparatus, and more particularly to apparatus to handle unitary packages forming, for example, compressible paper rolls, such as rolled toilet paper, kitchen towels, and similar packages, which arrive lying on the side and are to be delivered, for example stacked vertically.

BACKGROUND

Apparatus to stack packages is described, for example, in German Utility Model DE-Gm 79 31 246. The apparatus receives a stream of product packages from a supply transport. A plurality of the packages are introduced into a turning wheel, or the like, to be rotated by 90° and stand on end, to form a package assembly which, then can be packaged, for example in plastic foil, to form a multiple unit pack.

The multi-unit pack can be made by receiving the turned products from a delivery belt. Difficulties arise since the delivery belt must run at a somewhat faster speed than the turning speed of the turn-over wheel since, otherwise, a tooth or paddle of the turning wheel would turn over or throw over a previously placed package. This, of course, is governed by the geometry of the turnig wheel. Consequently, it is then necessary to transport the packages to yet another transport system operating at the turning speed of the turning wheel to form the multi-package pack. This multiple handling or transport system is space-consuming and requires additional apparatus.

Placing the turned products on a transport belt is not 100% reliable since some of the products may tip over, particularly if a plurality of products are stacked above each other. To retain the products in position and prevent malfunction, additional belts are necessary, for example located adjacent the support transport belt, in order to additionally guide the products in their proper path. Absolute synchronism of operation of the various belts is required, which is difficult to achieve due to localized stretching and the like.

German Patent Disclosure Document DE-OS 36 00 817 proposes to solve some of the problems in such apparatus by utilizing a turning wheel, with paddles or vanes, which not only pivots about a pivot point but, additionally, can move in translatory direction between a supply transport apparatus and a removal transport apparatus. The rotary movement of the turning wheel is synchronized with the translatory movement thereof; the translatory movement is superimposed on the rotary movement. Thus, the turning wheel has two functions: for one, it turns the packages, and for another, it shifts the packages from the receiving or supply transport to the removal transport system. It is possible to thereby assemble the products in a loose pack, adjacent each other, without requiring additional transport belts or the like.

THE INVENTION

It is an object to improve a structure in which a turning element has both pivoting as well as translatory movement, is compact, has high operating speed, and thus short cycling times.

Briefly, the pivoting or turning element is an essentially L-shaped or angled receiver, having two support surfaces of at least approximately 90° relation to each other, and joined together to define a corner. The receiver receives the packages on one surface, then pivots about 90°, which turns the surfaces, for example from the side to vertical positioning, i.e. about 90°. During this turning movement, the receiver is moved from a receiving or starting position to a delivery position. Upon return to pick up another package, or a group of parallel located packages, the receiver again tilts or pivots to the position in which the packages are applied to the receiving surface of the angle structure.

Rather than using a turning wheel or paddle arrangement, or a star wheel, an angular structure is used to erect and longitudinally move the respective packages. The arrangement has the advantage with respect to a paddle wheel that the mass to be moved is small, thus permitting high cycling and operating time. It can be made of lightweight material, constructed inexpensively and lighter than prior art structures.

The products are received from a supply transport and the wing or surface of the receiver then tips them by 90°. To permit quick removal without danger of tipping of the products beyond the 90°, it is desirable to carry out the rotary movement non-uniformly, that is, at a high acceleration and a low deceleration rate, in other words, to decrease the rate of angular movement as the angle reaches the delivery position. At the end of the movement of the receiver, thus, the product will be subjected essentially only to translatory motion components and any tipping or rotary component of movement to which it has been subjected has, for all practical purposes, ceased, so that it will not have the tendency to tip further.

The translatory movement, also, need not be uniform throughout; in accordance with a preferred feature of the invention, the translatory movement decelerates at a slower rate, that is, over a longer deceleration path than the initial acceleration. Thus, and this is true for the extended deceleration path in longitudinal movement, as well as the deceleration arc upon pivoting movement, the first row of products to form a pack is preferably handled at a lower speed than subsequent products which can engage against the previously turned and supplied products of a pack.

Rotation of the receiver can be obtained in various ways, for example by cylinder-piston arrangements operated by a suitable fluid, hydraulic or pneumatic; spring force may be used, in which the abutment permits release of stress of a stressed spring along a certain shifting path only gradually; in accordance with a preferred feature of the invention, the receiver is operated by a lever system; the receiver pivoting movement itself is guided by an engagement element which is in engagement with a guide track. The guide track is not fixed in position but, during translatory movement of the receiver, the guide track itself is shifted in position so that, as the receiver pivots and moves, the speed changes due to reorientation of the guide track. The guide track, for example, can be formed in a pivoted element which is supported on a piston-and-cylinder system. The guide track need not be straight but, preferably, is curved or angled.

In most cases, it is desirable to move the guide track or its holder structure by a pressure cylinder piston system during the time that the receiver is moved in translatory direction, for example essentially horizontally, and also is pivoting to turn the packages by 90°.

The receiver is preferably moved in the translatory direction by guide rods located adjacent the receiver. The guide rods can be adjusted in height, so that the receiver is guided from beneath the products to be accepted and, after supplying the products to the delivery apparatus, can dip below the support level of the now turned products. Forming the receiver as a comb-shaped structure, in which the tines of the comb define, together, a support surface, permits fitting of the comb structure between similarly located comb structures of the supply and receiving transport apparatus. Other arrangements may be used in order to control vertical shifting of the receiver.

Drawings, showing an illustrative embodiment:

FIG. 2 is an enlarged fragmentary view of the pivoting apparatus as pivoting is about to start;

FIG. 3 is a view similar to FIG. 2, but illustrating the position of the receiver as it is about to return to a starting position, and after the pivoting movement has been accomplished; and FIG. 4 is a highly schematic view illustrating the mechanism to control the receiver.

DETAILED DESCRIPTION

Figure 1:
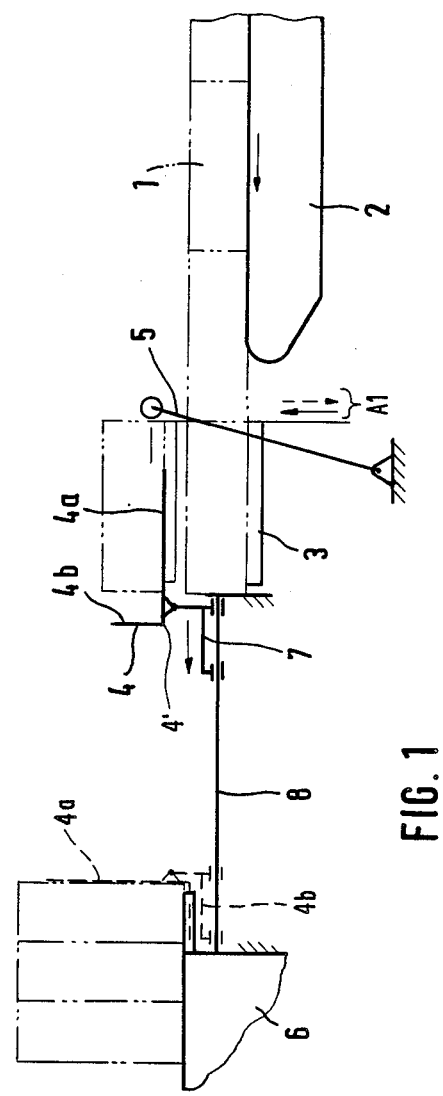
FIG. 1 is a highly schematic side view of the apparatus.

The product packages to be combined into a pack, for example toilet paper rolls 1, are received in pairs or as multiple adjacent rolls on a supply belt 2. They are pushed to a supply transport table 3 by subsequently arriving packages 1 or by any other pusher arrangement. The table 3, in the example shown, is a lifting table, as schematically shown by the arrows A1, raising and lowering the table in accordance with a cyclical cadence. The lifting table separates the respective rows of products from each other in order to supply them, in rows or group of rows, to a receiver 4. Receiver 4 is an angular structure of L shape. The lifting table 3 has an interrupted strip or grill surface, in comb shape, that is, formed with longitudinal slits through which the leg 4a of the receiver 4 can pass.

A push element 5 pushes the packages 1 on the receiver surface 4a, until the packages, or a group of packages, engage the upstanding leg 4b of the receiver.

A removal transport system 6 is provided, for example a belt transport system or the like, which is positioned spaced by some distance from the supply transport apparatus 2 and the lifting table 3. The removal transport system 6 receives the products from the receiver 4, after they have been tipped over by 90°. The products can be placed on the receiver transport system 6, to engage against each other, as will be described in detail below. The supply transport system 2 and the removal transport system 6 can be arranged in different geometrical association than the one shown, and it is also easily possible to place the respective transport systems at different levels. In accordance with a simple change of the arrangement of the lifting table 3, various vertical relative positions can be used.

The receiver 4 tilts, but does not tip or tilt or rotate about a fixed axis; in addition to the pivoting movement, the receiver 4 carries out a translatory movement generally directed towards the removal transport apparatus and in the direction of removal.

The receiver 4, in order to carry out both rotary or pivoting as well as translatory movement, is supported on a carriage 7 which is guided on two lateral guide rods 8. FIG. 1 illustrates the arrangement only schematically, since any suitable mechanical arrangement can be used. The guide rods 8 terminate at a level which will place the leg 4b of the receiver just slightly below the comb-shaped support surface of the removal transport apparatus, as shown by the broken lines in FIG. 1. This permits release of the products 1, now tilted through 90°, from the surface 4b.

Operation, with reference to FIGS. 2 and 3:

FIGS. 2 and 3 illustrate sequential positions during an operating cycle of the apparatus. The stream of products 1, as seen in FIG. 1, are received on the receiver 4 when the angle leg 4a is in the horizontal position, as shown. The first row of products 1 is separated on the lifting table 3 (FIG. 1) and raised to a position in which the lower edge of the products is just slightly above the leg 4a of the receiver 4, see FIG. 2. This ensures that, when the receiver 4 moves towards the right, the lower edges of the products are not damaged thereby. In the next operating step, the lifting table 3 is dropped at least to the extent that the products are now retained and supported only on the receiver 4. In a preferred form, and which is somewhat more advantageous, the receiver 4 starts its pivoting movement in advance of the translatory movement, and thereby slightly raises the groups of products 1 on the support surface 4a. Upon further pivoting of the receiver 4, translatory and combined pivoting movement will occur. The receiver 4 will move towards the left, as shown schematically by arrow A2, until it will have reached the position shown in FIG. 2 in broken lines. In FIG. 3, the receiver is shown in not tilted position in broken lines and in full lines in tilted position. At the same times as the product groups are delivered from the leg 4b to the removal transport system 6, the leg 4a pushes the product groups onto the removal transport apparatus 6 while, additionally, pushing the last preceding stacked groups of products towards the left on the removal transport apparatus 6.

In the next operating cycle, the receiver 4 is moved towards the right, as shown schematically by arrow A3 and, further, is tipped again in the position shown in broken lines in FIG. 3. The tilting from full-line to broken-line position in FIG. 3 is carried out over a very short distance along the translatory or slide path, that is, an abrupt tilting or tipping over. The forward rotation from the position shown in FIG. 2 into the full-line position of FIG. 3 is carried out much more slowly and gently since products are on the receiver and the tipping of the products must be carried out gently.

FIG. 4 illustrates, schematically, a mechanical arrangement which provides for translatory movement of the carriage 7 and for the composite movement of the receiver 4. A lever 9 has its lower end secured to a pivoting rod 9a which, in turn, is journalled on the machine frame. The lever 9 is coupled at its upper end to a push rod 10. The lever 9 is oscillated back and forth by a crank 12 which is coupled to a rotary crankshaft 11. The crank 12 engages the lever 9 at a position intermediate its attachment to the pivot shaft 9a and the connection to the push rod 10. This provides for amplification of the movement of crankshaft 11 as it rotates.

The pivoting movement of the receiver 4 is generated by a guide track 13 which is engaged by a guide pin 14, coupled to the receiver 4. The guide track 13 is suitably shaped to control the receiver 4 to pivot as it is pushed forward along the guide rods 8 by the push rod 10. This movement can be obtained by shaping the track 13, in which the engagement element or pin 14 rides, in curved form, so that the receiver 4, shown only in line form in FIG. 4, will rotate or pivot. This arrangement alone does not, however, as preferred and desirable, have difference in movement rate when the receiver moves forwardly (arrow A2, FIG. 2) or reverses (arrow A3, FIG. 3). To obtain faster return of the receiver 4 in comparison to the forward movement, the guide track 13 changes position as the receiver 4 moves. To permit the guide track 13 to change position, it is pivotably secured at its right side to the frame of the machine and, at its left side, it is coupled to a cylinder-piston arrangement 15, for example a pneumatic cylinder-piston system, to permit vertical adjustment or change of position of the guide track 13.

Operation, FIG. 4:

As the carriage 7 moves towards the left in FIG. 4, the receiver 4 will immediately begin to tilt. Tilting movement is terminated before the slide carriage 7 reaches its final or end position. Upon return of the slide carriage 7 to the starting or rest position, the return rotation of the receiver will begin only when the leg 4b has left the region in which the products are placed on the removal transport system 6, that is, when the surface 4b is no longer beneath the products which have just been delivered. Further, the return pivoting or rotary movement must be terminated promptly so that the surface 4b can enter in interdigited arrangement with the lifting table 3 and beneath the next products to be delivered by the lifting table.

FIGS. 2 and 3 illustrate the operation without height adjustment of the receiver 4. The removal transport system can be extended with a comb-like extension 6a through which the receiver 4 can pass with the surface 4b. This permits the horizontal leg 4b to be released from the products before the receiver 4 is in its final horizontal position, and permits transfer of the products to the slightly higher placed part 6a of the removal transport system 6.

The crankshaft 11, the pneumatic cylinder 15, the supply transport system 2 and the removal transport system 6 are all controlled in synchronism, for example by a timing control unit C. Such sequential multiple timers are well known and any suitable apparatus can be used. The relative timing and association of movement of the carriage 4 with respect to the position of the crankshaft 11 is so selected that the shifting path of the carriage 7, upon rotation of the crankshaft 11, causes initially gentle acceleration and, as the carriage 7 reaches its terminal position at the left, results in gentle deceleration. This movement, readily obtainable from a crankshaft-and-crankpin arrangement, in combination with control of the cylinder-piston system 15, ensures that the horizontal acceleration of the products 1 is small when the receiver 4 reaches its final left-side position, which prevents tipping-over of products in the shifting direction or feed direction formed by movement of the carriage 7 in the slide path along the guide rods 8.

FIG. 4 shows the engagement region 4' of the receiver 4 coupled to the pin 14, operating in the guide track 13. The comb-like elements of the receiver 4 are shown only in fragmentary representation in FIG. 4, for clarity. The pin or guide element 14, operating within the guide track 13, can be secured to the receiver 4 in any suitable manner, for example by an attached link 14a.

Various changes and modifications may be made within the scope of the inventive concept.

I claim:

1. Package handling and reorienting apparatus, particularly to receive rolls of compressible paper products, such as toilet paper, kitchen towels and the like, from a supply transport apparatus, (2,3) and turn the packages (1) by 90° to stand the packages on end for delivery to a removal apparatus (6), said handling and re-orienting apparatus including a generally L-shaped angled movable receiver (4) having two support surfaces (4a, 4b) defining a generally L-shaped structure, said support surfaces being joined at a corner of the L-shaped structure;

means for supporting said receiver to receive the packages at a starting position of the receiver on one (4a) of said support surfaces, the receiver with the packages thereon pivoting about 90°, and translating between the supply apparatus (2) and the removal apparatus (6), for delivering said products(1), turned 90°, to the removal apparatus, and the receiver moving in reverse pivoting and translatory movement to the starting position;

wherein said support means for the receiver includes a guide means (8) guiding translatory movement of the receiver from said starting position to the removal apparatus and means for pivoting said receiver at a speed which is higher when the receiver moves from the removal apparatus towards said starting position than when the receiver moves from the starting position towards the removal apparatus, comprising a reciprocally movable guide track (13), and an engagement means (14) coupled to and movable in the guide track and secured to the receiver; and a moving means (15) coupled to the guide track (13) to reciprocally move the guide track into selectively different positions as the receiver (4) moves from the starting position towards the removal apparatus (6) and vice versa.

2. The apparatus of claim 1, further including synchronizing means (C) synchronizing moving of said moving means (15) for the guide track (13) and translatory movement of the receiver (4) between the starting position and a position adjacent said removal apparatus (6).

3. The apparatus of claim 1, wherein said guide track (13) is, at least in part, curved.

4. The apparatus of claim 1, when said guide means includes guide rods (8) extending from the starting position towards the removal apparatus to guide the translatory movement of said receiver (4).

5. The apparatus of claim 1, wherein, the engagement means (14) upon engagement with the guide track (13) pivoting or tilting the receiver through an angle of about 90° for standing said packages (1) on end during the translatory movement of the receiver.

6. The apparatus of claim 5, further comprising operating means (9, 9a, 10, 11, 12), including a crank and crankshaft (12, 11) coupled to the receiver to move the receiver in a cycle including first a gentle acceleration, then rapid movement, then gentle deceleration, as the receiver reaches a position adjacent the removal apparatus;

and wherein said moving means (15) coupled to the guide track (13), upon return movement of the receiver (4) from the position adjacent the removal apparatus (6) to the starting position, is controlled, by movement of said guide track, to cause the receiver to pivot abruptly through an angle of about 90° to place the receiver with said one surface for reception of the packages in position adjacent the supply apparatus to receive new products prior to approaching said position adjacent the supply apparatus.

7. The apparatus of claim 6, wherein the pivoting movement of the receiver occurs at a slower rate of pivoting as the receiver approaches the removal transport apparatus during the translatory movement of the receiver.

8. The apparatus of claim 2, wherein the moving means (15) move the guide track and hence the receiver (4) in a vertical direction when the receiver approaches at least one of: said supply apparatus (2); and said removal apparatus (6).

9. The apparatus of claim 1, wherein at least one of said support surfaces (4a, 4b) is constructed as a comb structure having projecting tines;

and wherein at least one of: said supply apparatus (2); said removal apparatus (6) includes support surface means (3, 6a) in grid or comb form, positioned for interdigited engagement with said support surfaces of the receiver.

10. The apparatus of claim 5, further including synchronizing means (C) synchronizing movement of said moving means (15) for the guide track (13) and translatory movement of the receiver (4) between the starting position and a position adjacent said removal apparatus (6).

11. The apparatus of claim 6, further including synchronizing means (C) synchronizing movement of said moving means (15) for the guide track (13) and translatory movement of the receiver (14) between the starting position and a position adjacent said removal apparatus (6).

12. The apparatus of claim 7, further including synchronizing means (C) synchronizing movement of said moving means (15) for the guide track (13) and translatory movement of the receiver (4) between the starting position and a position adjacent said removal apparatus (6).

* * * * *